(12) United States Patent
Shibayama

(10) Patent No.: US 10,156,319 B2
(45) Date of Patent: Dec. 18, 2018

(54) GASHOLDER SEALING MEMBER AND GASHOLDER SEALING STRUCTURE

(71) Applicant: The Yokohama Rubber Co., LTD., Minato-ku, Tokyo (JP)

(72) Inventor: Satoshi Shibayama, Hiratsuka (JP)

(73) Assignee: The Yokohama Rubber Co., LTD. (JP)

(*) Notice: Subject to any disclaimer, the term of this patent is extended or adjusted under 35 U.S.C. 154(b) by 95 days.

(21) Appl. No.: 14/440,330

(22) PCT Filed: Oct. 23, 2013

(86) PCT No.: PCT/JP2013/078662
§ 371 (c)(1),
(2) Date: May 1, 2015

(87) PCT Pub. No.: WO2014/069294
PCT Pub. Date: May 8, 2014

(65) Prior Publication Data
US 2015/0276127 A1 Oct. 1, 2015

(30) Foreign Application Priority Data

Nov. 2, 2012 (JP) .................................. 2012-242397

(51) Int. Cl.
*F16J 15/52* (2006.01)
*F17B 1/26* (2006.01)
*F17C 1/00* (2006.01)

(52) U.S. Cl.
CPC ................. *F17B 1/26* (2013.01); *F16J 15/52* (2013.01); *F17C 1/00* (2013.01);
(Continued)

(58) Field of Classification Search
None
See application file for complete search history.

(56) References Cited

U.S. PATENT DOCUMENTS 3,241,379 A * 3/1966 Aa .............................. F16J 3/06
277/634
4,695,201 A * 9/1987 Beskow .................. E02B 17/00
114/296
(Continued)

FOREIGN PATENT DOCUMENTS

JP H07-260091 10/1995
JP 2001-271994 10/2001
(Continued)

OTHER PUBLICATIONS

International Search Report for International Application No. PCT/JP2013/078662 dated Dec. 10, 2013, 4 pages, Japan.

*Primary Examiner* — Vishal A Patel
*Assistant Examiner* — Thomas L Neubauer
(74) *Attorney, Agent, or Firm* — Thorpe North & Western

(57) ABSTRACT

In a cylindrically-formed gasholder sealing member interposed between an inner circumferential surface of a tank constituting a gasholder and an outer edge of a shock-absorbing member that rises and falls within the tank along with a movable piston that rises and falls within the tank at an outer circumferential side of the movable piston, both surfaces of at least a tank-ward end, out of a tank-ward end on a side anchored to the inner circumferential surface of the tank and a shock-absorbing member-ward end on a side anchored to the outer edge of the shock-absorbing member, are covered by ethylene propylene diene rubber, and a portion other than the tank-ward end and the shock-absorbing member-ward end is not covered by ethylene propylene diene rubber.

14 Claims, 10 Drawing Sheets

(52) U.S. Cl.
CPC .............. *F17C 2201/0176* (2013.01); *F17C 2201/032* (2013.01); *F17C 2201/052* (2013.01); *F17C 2201/054* (2013.01); *F17C 2223/0123* (2013.01); *F17C 2223/033* (2013.01); *F17C 2270/0134* (2013.01)

(56) References Cited

U.S. PATENT DOCUMENTS

| | | | | |
|---|---|---|---|---|
| 4,902,304 | A * | 2/1990 | Hallen | F17B 1/12 220/560.08 |
| 5,255,722 | A * | 10/1993 | Furstenberg | B65D 90/38 141/114 |
| 5,343,908 | A | 9/1994 | Furstenberg | |
| 2010/0084408 | A1* | 4/2010 | Wang | F17C 1/00 220/565 |

FOREIGN PATENT DOCUMENTS

| | | |
|---|---|---|
| JP | 2003-113366 | 4/2003 |
| JP | 2005-206164 | 8/2005 |
| JP | 2006-234095 | 9/2006 |

* cited by examiner

GASHOLDER SEALING MEMBER AND GASHOLDER SEALING STRUCTURE

TECHNICAL FIELD

The present technology relates to a gasholder sealing member and a gasholder sealing structure, and, more specifically, to a gasholder sealing member and a gasholder sealing structure that allow for improved bending resistance at low temperatures in cold regions while maintaining superior gas-tightness.

BACKGROUND

Wiggins gasholders and the like are generally known in the art as apparatus for recovering and storing gas. Such gasholders are provided with a tank for storing gas, a movable piston that rises and falls within the tank, a shock-absorbing member that rises and falls within the tank along with the movable piston, and cylindrical sealing members that connect the tank to the shock-absorbing member and the shock-absorbing member to the movable piston. These sealing members are formed from chloroprene rubber, acrylonitrile butadiene rubber, or the like (see, for example, Japanese Unexamined Patent Application Publication Nos. 2001-271994A and 2003-113366A).

Of these two cylindrical sealing members, the sealing member disposed between the tank and the shock-absorbing member has one end anchored to an inner circumferential surface of the tank and the other end anchored to an outer edge of the shock-absorbing member. Thus, the areas near the one end (tank-ward end) and the other end (shock-absorbing member-ward end) of the sealing member are constantly in a bent state, with this bent state varying with the vertical movement of the movable piston and shock-absorbing member. Thus, in addition to superior gas-tightness so as to prevent the stored gas from leaking, bending resistance is demanded for the sealing member.

However, when a gasholder is installed in a cold region, the sealing member may be cooled to near the brittleness point of the rubber. In particular, the tank-ward end of the sealing member tends to transmit the low temperature of the outside air via the wall faces of the tank. A sealing member formed from chloroprene rubber or acrylonitrile butadiene rubber will exhibit inferior cold resistance, leading to the problem that cracks are readily formed in the member at low temperatures in cold regions even if no cracks are formed in the bent section at normal temperatures. On the other hand, a sealing member formed from a rubber other than chloroprene rubber or acrylonitrile butadiene rubber will exhibit inferior durability (gas resistance) against methane gas and the like, leading to the problem that the fundamental function of the sealing member is inhibited.

SUMMARY

The present technology provides a gasholder sealing member and a gasholder sealing structure that allow for improved bending resistance at low temperatures in cold regions while maintaining superior gas-tightness.

A gasholder sealing member according to the present technology is a cylindrically-formed gasholder sealing member interposed between an inner circumferential surface of a tank constituting a gasholder and an outer edge of a shock-absorbing member that rises and falls within the tank along with a movable piston that rises and falls within the tank at an outer circumferential side of the movable piston, the gasholder sealing member wherein both surfaces of at least a tank-ward end, out of the tank-ward end on a side anchored to the inner circumferential surface of the tank and a shock-absorbing member-ward end on a side anchored to the outer edge of the shock-absorbing member are covered by ethylene propylene diene rubber, and a portion other than the tank-ward end and the shock-absorbing member-ward end is not covered by ethylene propylene diene rubber.

A gasholder sealing structure according to the present technology is a gasholder sealing structure comprising a cylindrically-formed gasholder sealing member that forms a seal between an inner circumferential surface of a tank constituting a gasholder and an outer edge of a shock-absorbing member that rises and falls within the tank along with a movable piston that rises and falls within the tank at an outer circumferential side of the movable piston, the structure comprising a tank-side anchoring member that projects from the inner circumferential surface of the tank and anchors a tank-ward end of the gasholder sealing member and a shock-absorbing member-side anchoring member that is provided on the outer edge of the shock-absorbing member and anchors a shock-absorbing member-ward end of the gasholder sealing member, both surfaces of at least the tank-ward end, out of the tank-ward end and the shock-absorbing member-ward end, being covered by ethylene propylene diene rubber, a portion other than the tank-ward end and the shock-absorbing member-ward end not being covered by ethylene propylene diene rubber, and a surface of the portion of the gasholder sealing member not covered by ethylene propylene diene rubber not contacting the inner circumferential surface of the tank and the tank-side anchoring member regardless of the vertical position of the shock-absorbing member.

Another gasholder sealing structure according to the present technology is a gasholder sealing structure comprising a cylindrically-formed gasholder sealing member that forms a seal between an inner circumferential surface of a tank constituting a gasholder and an outer edge of a shock-absorbing member that rises and falls within the tank along with a movable piston that rises and falls within the tank at an outer circumferential side of the movable piston, the structure comprising a tank-side anchoring member that projects from the inner circumferential surface of the tank and sandwiches and anchors a tank-ward end of the gasholder sealing member between itself and the inner circumferential surface of the tank, and a shock-absorbing member-side anchoring member that is provided on the outer edge of the shock-absorbing member and anchors a shock-absorbing member-ward end of the gasholder sealing member, a surface of the tank-ward end facing the inner circumferential surface of the tank being covered by ethylene propylene diene rubber, and a surface of the tank-side anchoring member facing the tank-ward end being covered by ethylene propylene diene rubber.

As described above, both surfaces of at least the tank-ward end, out of the tank-ward end and the shock-absorbing member-ward end, of the gasholder sealing member (hereinafter, referred to as "sealing member") of the present technology are covered by ethylene propylene diene rubber (hereinafter, referred to as "EPDM"), and the portion other than the tank-ward end and the shock-absorbing member-ward end is not covered by EPDM, with the result that EPDM, which has superior cold resistance, contacts the inner circumferential surface of the tank at the tank-ward end, where the low temperature of the outside air is most easily transmitted. This allows for improved bending resistance at low temperatures in the tank-ward end. Moreover, the interposition of EPDM inhibits the transmission of the low temperature of the outside air to other portions, thereby also improving the bending resistance at low temperatures of the sealing member as a whole. Accordingly, even if the gasholder is installed in a cold region, disadvantages such as crack formation in the sealing member at low temperatures can be thereby prevented. In addition, because only the ends of the sealing member are covered by EPDM, any material of superior durability against the gas stored in the tank (i.e., gas resistance) can be selected for the main body of the sealing member. This allows the fundamental function of the sealing member (i.e., gas-tightness) to be maintained at a satisfactory level without any degradation thereof.

Both surfaces of the shock-absorbing member-ward end can also be covered by EPDM. Such an arrangement allows for improved bending properties at low temperatures in the shock-absorbing member-ward end, which, like the tank-ward end, easily transmits the low temperature of the outside air, yielding a further improvement in the bending resistance at low temperatures of the sealing member as a whole. This is even more advantageous in preventing crack formation at low temperatures.

The length covered by EPDM can be differentiated between one surface and the other surface of the end(s) covered by EPDM. It is thus possible to avoid abrupt changes in bending rigidity at the boundary between the portion where both surfaces are covered by EPDM and the portion not covered by EPDM. This eliminates excess concentrations of stress, which is advantageous in improving bending resistance. In addition, EPDM is used only on the necessary portions (lengths), allowing the amount of EPDM used to be minimized and material costs to be kept down.

The thickness covered by EPDM can be differentiated between one surface and the other surface of the end(s) covered by EPDM. This allows the minimum necessary thickness covered by EPDM to be used on each of the surfaces, and increases in the bending rigidity of the end(s) covered by EPDM to be suppressed. This is advantageous in improving bending resistance. The amount of EPDM used can also be minimized, and material costs kept down.

The thickness covered by EPDM is set, for example, to 1.2 mm to 1.4 mm. This allows for improved bending resistance while effectively suppressing transmission of the low temperature of the outside air to the main body of the sealing member.

As described above, the gasholder sealing structure according to the present technology is provided with a tank-side anchoring member and a shock-absorbing member-side anchoring member, with both surfaces of at least the tank-ward end, out of the tank-ward end and the shock-absorbing member-ward end, being covered by EPDM, the portion other than the tank-ward end and the shock-absorbing member-ward end not being covered by EPDM, and a surface of the portion of the sealing member not covered by EPDM not contacting the inner circumferential surface of the tank and the tank-side anchoring member regardless of the vertical position of the shock-absorbing member, thereby inhibiting the transmission of the low temperature of the outside air to portions of the sealing member not covered by EPDM, and allowing the bending resistance at low temperatures of the sealing member as a whole to be improved. Moreover, EPDM contacts the inner circumferential surface of the tank, allowing the bending resistance at low temperatures of the tank-ward end to be improved. Accordingly, even if the gasholder is installed in a cold region, disadvantages such as crack formation in the sealing member at low temperatures can be prevented.

A configuration in which both surfaces of the shock-absorbing member-ward end are covered by EPDM and the surface of the portion of the sealing member not covered by EPDM does not contact the shock-absorbing member regardless of the vertical position of the shock-absorbing member is also possible. Such a configuration allows for improved bending resistance at low temperatures in the shock-absorbing member-ward end, which, like the tank-ward end, easily transmits the low temperature of the outside air, yielding a further improvement in the bending resistance at low temperatures of the sealing member as a whole. This is even more advantageous in preventing crack formation at low temperatures.

As described above, another gasholder sealing structure according to the present technology is provided with a tank-side anchoring member and a shock-absorbing member-side anchoring member, with a surface of the tank-ward end facing the inner circumferential surface of the tank being covered by EPDM, and a surface of the tank-side anchoring member facing the tank-ward end being covered by EPDM, thereby inhibiting the transmission of the low temperature of the outside air to portions of the sealing member not covered by EPDM, and allowing for improved bending resistance at low temperatures in the sealing member as a whole. In addition, the sealing member itself does not contact the inner circumferential surface of the tank and the tank-side anchoring member at the tank-ward end thereof, thereby allowing for improved bending resistance at low temperatures in the tank-ward end. Accordingly, even if the gasholder is installed in a cold region, disadvantages such as crack formation in the sealing member at low temperatures can be prevented. In addition, only one surface of the sealing member itself is covered by EPDM at the tank-ward end, thereby avoiding abrupt changes in bending rigidity at the boundary between portions covered by EPDM and portions not covered by EPDM and preventing excessive concentrations of stress, which is advantageous in improving bending resistance.

DETAILED DESCRIPTION

Figure 1:
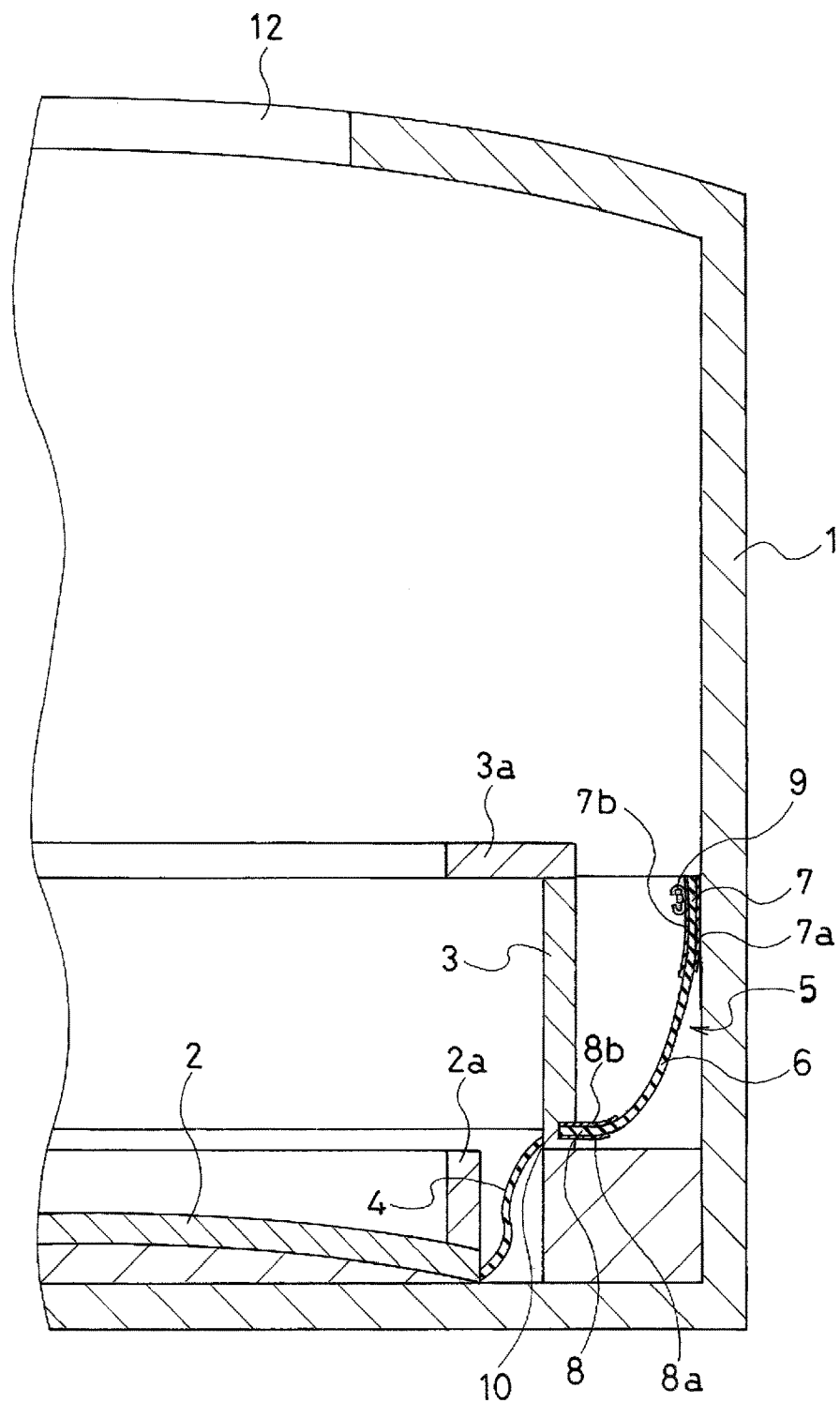
FIG. 1 is a cross-sectional view of the main parts of a gasholder (not filled with gas) using a gasholder sealing member according to the present technology.

The following is a detailed description of the present technology with reference to the accompanying drawings.

As illustrated in FIGS. 1 to 4, a gasholder is provided with a cylindrical tank 1 for storing gas, a movable piston 2 that rises and falls within the tank 1 and is round in shape as seen in a plan view, and a cylindrical shock-absorbing member 3 that rises and falls within the tank 1 along with the movable piston 2 at an outer circumferential side of the movable piston 2. The gasholder is also provided with a piston sealing member 4 connecting the movable piston 2 and the shock-absorbing member 3, and a tank sealing member 5 connecting the shock-absorbing member 3 and the tank 1. The sealing member according to the present technology is the tank sealing member 5 interposed between the inner circumferential surface of the tank 1 and the outer edge of the shock-absorbing member 3.

A projection 2*a* that projects toward the upper side of the tank is provided on a circumferential edge of the movable piston 2. A flange 3*a* that projects toward the center of the tank is provided on an upper end of the cylindrical shock-absorbing member 3. The projection 2*a* of the movable piston 2 contacts the flange 3*a* of the shock-absorbing member 3 when the movable piston 2 rises.

One axial direction end of the piston sealing member 4 is attached to the circumferential edge of the movable piston 2, and the other end is attached to the lower end of the shock-absorbing member 3. One axial direction end of the tank sealing member 5 according to the present technology is attached to the lower end of the shock-absorbing member 3, and the other end is attached to the inner circumferential surface of the tank 1. The sealing members 4, 5 are flexible so as to allow them to follow the movement of the movable piston 2 and the shock-absorbing member 3, and serve to form a gastight seal on a gas storage space 11 enclosed by the tank 1 and the movable piston 2.

Figure 2:
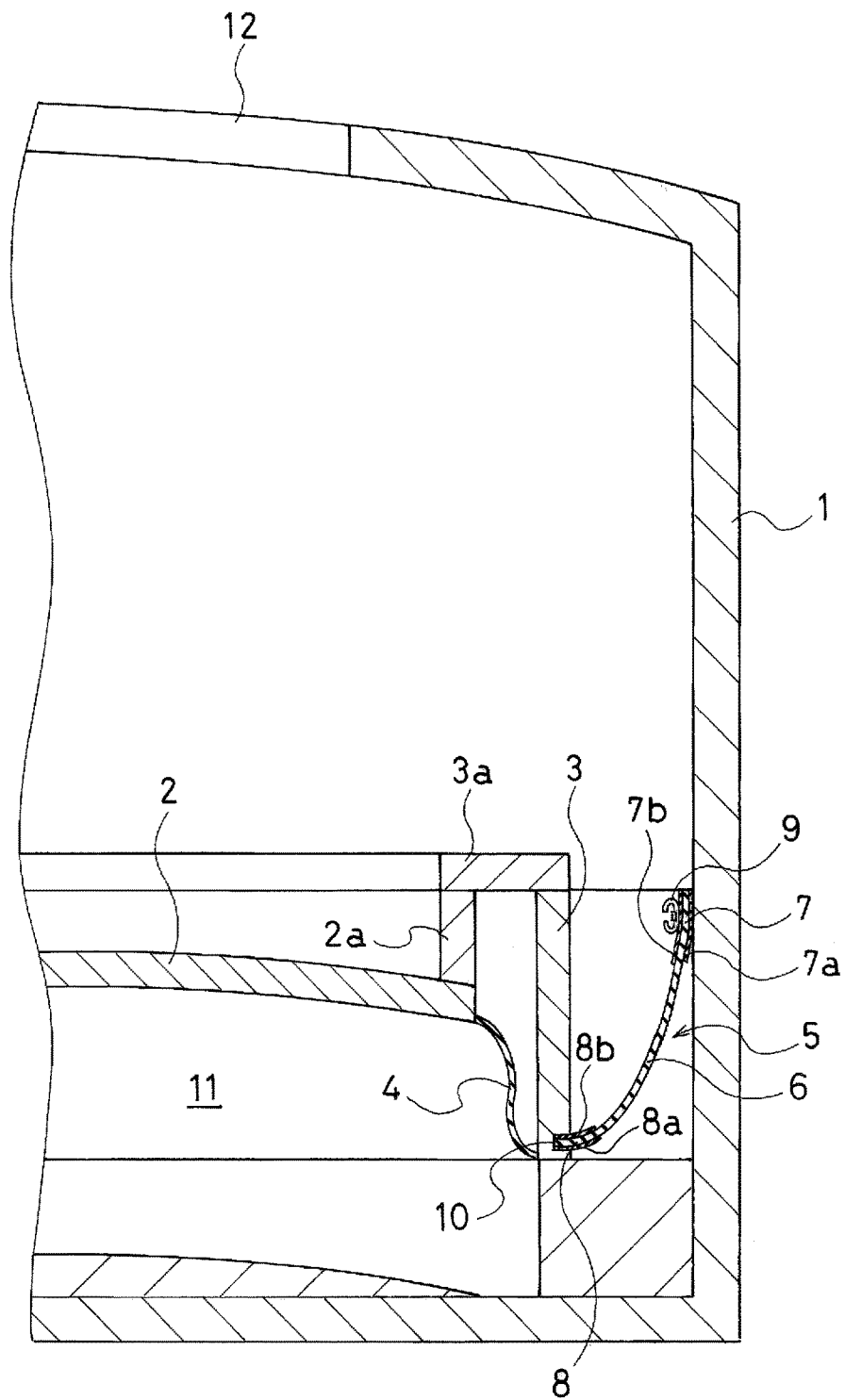
FIG. 2 is a cross-sectional view of the main parts of a gasholder (filled to roughly ⅓ of maximum capacity with gas) using the gasholder sealing member according to the present technology.
Figure 3:
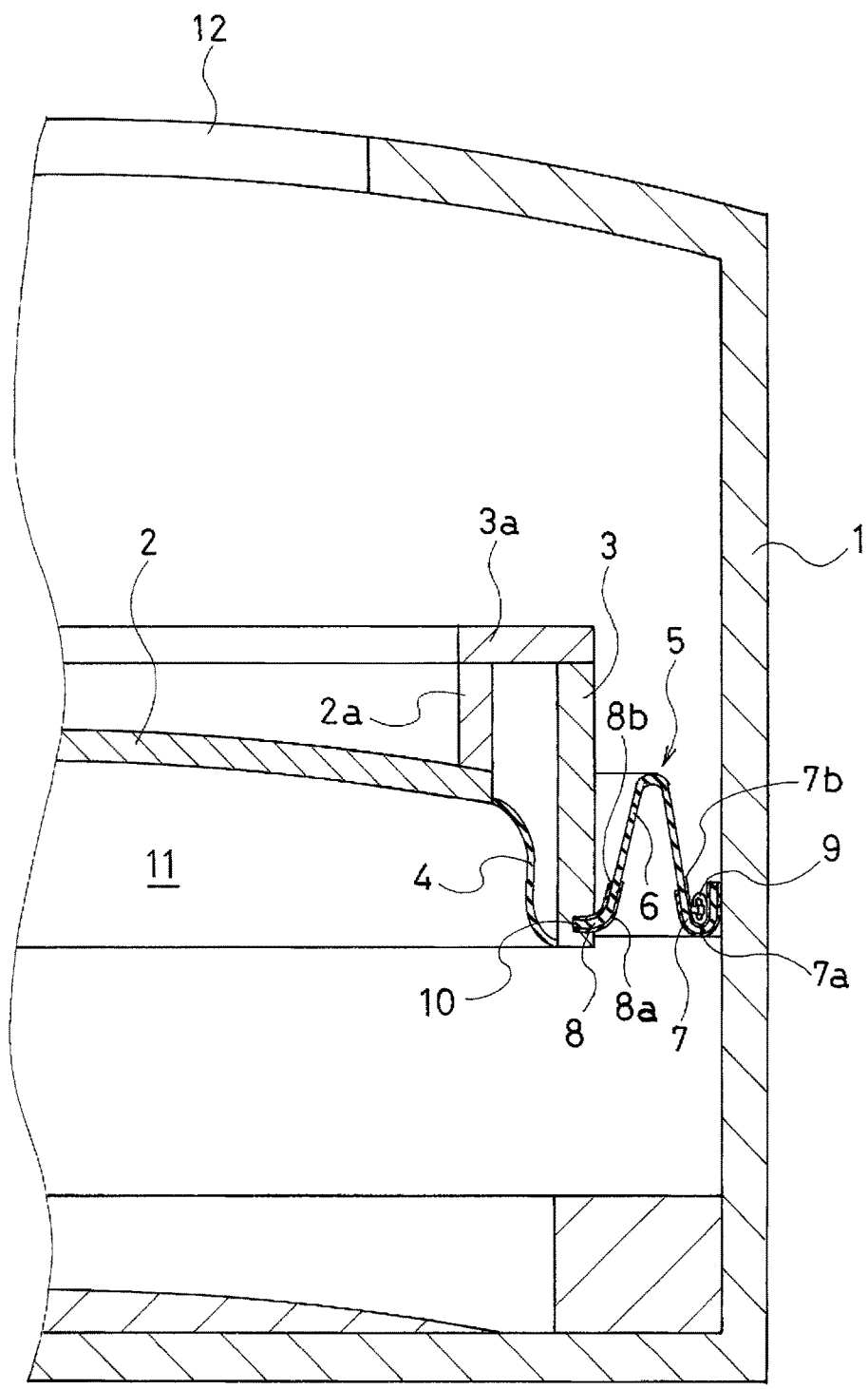
FIG. 3 is a cross-sectional view of the main parts of a gasholder (filled to roughly ⅔ of maximum capacity with gas) using the gasholder sealing member according to the present technology.
Figure 4:
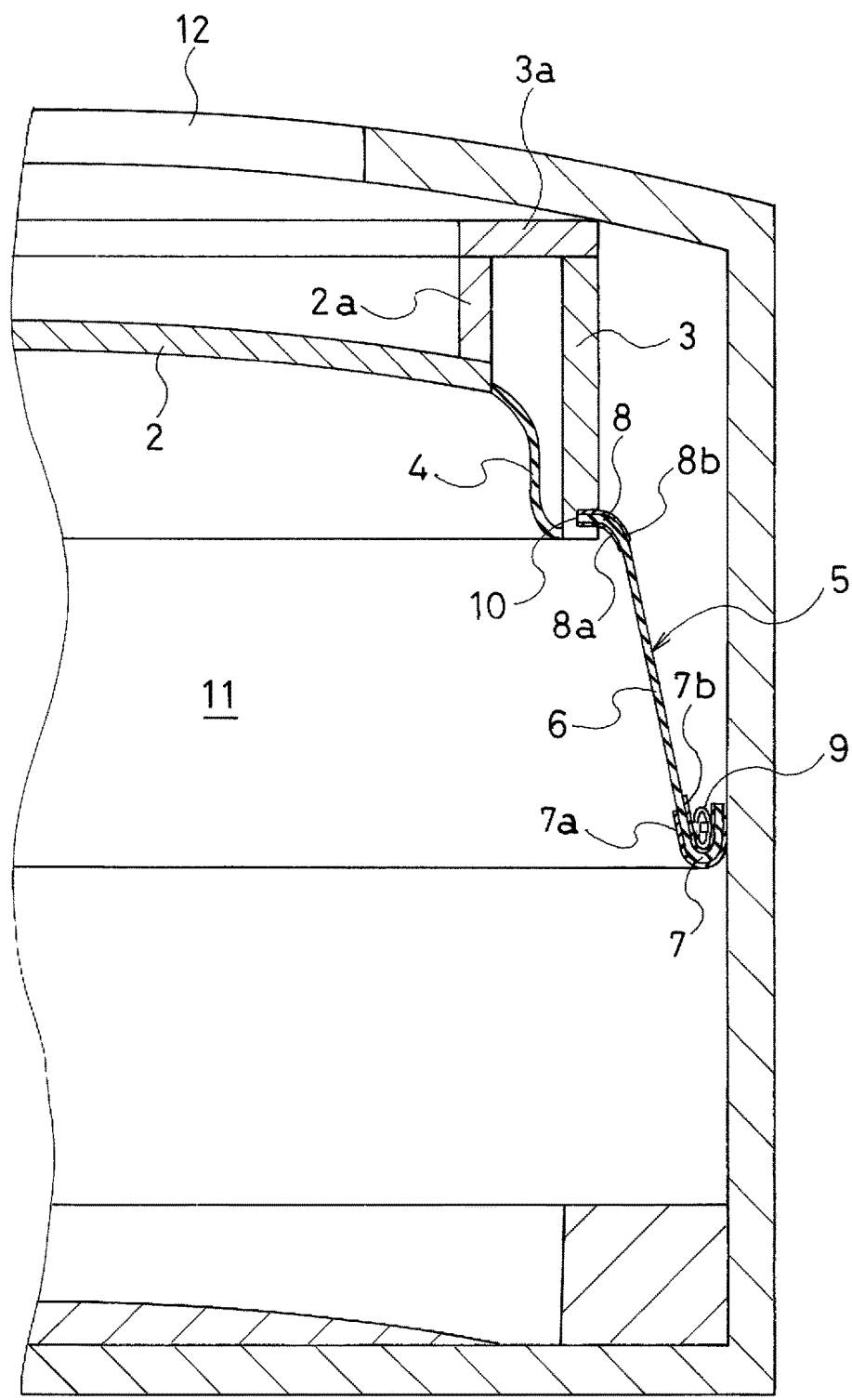
FIG. 4 is a cross-sectional view of the main parts of a gasholder (filled to maximum capacity with gas) using the gasholder sealing member according to the present technology.

Next, the operation of the gasholder will be described. When the gas storage space 11 within the tank 1 is not filled with any gas at all, as illustrated in FIG. 1, the movable piston 2 and the shock-absorbing member 3 are positioned at the bottom of the tank 1. When gas is delivered into the gas storage space 11, the movable piston 2 rises within the tank 1, and the projection 2*a* of the movable piston 2 contacts the flange 3*a* of the shock-absorbing member 3, as illustrated in FIG. 2. When more gas is delivered into the gas storage space 11, the shock-absorbing member 3 rises within the tank 1 along with the movable piston 2, as illustrated in FIG. 3. Then, when the shock-absorbing member 3 contacts the upper part of the tank 1 as illustrated in FIG. 4, the rising of the movable piston 2 is regulated, and the gas storage space 11 reaches maximum capacity. When the gas is discharged to the outside, the exact opposite of the operation described above occurs. The bent state of the sealing members 4, 5 thus greatly varies as the movable piston 2 and shock-absorbing member 3 rise and fall.

The tank sealing member 5 according to the present technology comprises a main body 6 forming the base of the tank sealing member 5, and cover parts 7*a*, 7*b*, 8*a*, 8*b* provided on both surfaces of the ends of the main body 6. The main body 6 consists of a base fabric made of fibrous material covered by a rubber material. A material that does not readily allow the stored gas to permeate and has properties such that it will not readily degrade as the result of contact with the stored gas is used as the rubber material covering the base fabric according to the gas being stored. For example, if the gas being stored is methane gas, chloroprene rubber or acrylonitrile butadiene rubber can be used. The thickness of the main body 6 is, for example, about 3 mm.

The cover parts 7*a*, 7*b*, 8*a*, 8*b* are all formed from EPDM. The cover parts 7*a*, 7*b* are provided on a tank-ward end 7 on a side anchored to the inner circumferential surface of the tank 1. The cover parts 8*a*, 8*b* are provided on a shock-absorbing member-ward end 8 on a side anchored to the outer edge of the shock-absorbing member 3. The cover parts 7*a*, 7*b*, 8*a*, 8*b* can cover the main body 6 of the tank sealing member 5 by, for example, vulcanization-bonding sheets of EPDM thereto. The cover parts 7*a*, 7*b* can also cover the main body 6 of the tank sealing member 5 by bolting sheets of EPDM in place along with the main body 6 of the tank sealing member 5 when the tank sealing member 5 is anchored to the inner circumferential surface of the tank 1. The sheets of EPDM can also be cloth-inserted sheets in order to increase strength.

Out of the cover parts 7*a*, 7*b*, 8*a*, 8*b*, it is not absolutely essential to provide cover parts 8*a*, 8*b* disposed on the shock-absorbing member-ward end 8 of the tank sealing member 5, but at least the cover parts 7*a*, 7*b* are provided on the tank-ward end 7, where the low temperature of the outside air is most easily transmitted.

The sealing structure according to the present technology comprises the tank sealing member 5 described above. Specifically, as illustrated in FIGS. 5 to 8, the structure is provided with a tank-side anchoring member 9 projecting from the inner circumferential surface of the tank 1, and a shock-absorbing member-side anchoring member 10 provided on an outer edge of the shock-absorbing member 3. Both surfaces of at least the tank-ward end 7, out of the tank-ward end 7 and the shock-absorbing member-ward end 8, are covered by EPDM, with the portion other than the tank-ward end 7 and the shock-absorbing member-ward end 8 not being covered by EPDM, and the surface of the portion of the tank sealing member 5 not covered by EPDM not contacting the inner circumferential surface of the tank 1 and the tank-side anchoring member 9 regardless of the vertical position of the shock-absorbing member 3.

As described above, both surfaces of the tank-ward end 7 are covered with cover parts 7*a*, 7*b* of EPDM, with the result that EPDM, which has superior cold resistance, contacts the inner circumferential surface of the tank 1 at the tank-ward end 7, and EPDM contacts the tank-side anchoring member 9. Thus, the tank-ward end 7 does not directly contact members that are susceptible to the effects of external air, thereby improving the bending resistance at low temperatures of the tank-ward end 7. In addition, the interposition of EPDM inhibits the transmission of the low temperature of the outside air to the main body 6, which is not covered by EPDM, thereby also improving the bending resistance at low temperatures of the sealing member 1 as a whole. Accordingly, even if the gasholder is installed in a cold region, disadvantages such as crack formation in the tank sealing member 5 at low temperatures can be prevented. In addition, because only the ends of the tank sealing member 5 are covered by EPDM, any material of superior durability against the gas stored in the tank 1 (i.e., gas resistance) can be selected for the main body 6 of the tank sealing member 5. This allows the fundamental function of the tank sealing member 5 (i.e., gas-tightness) to be maintained at a satisfactory level without any degradation thereof.

Figure 5:
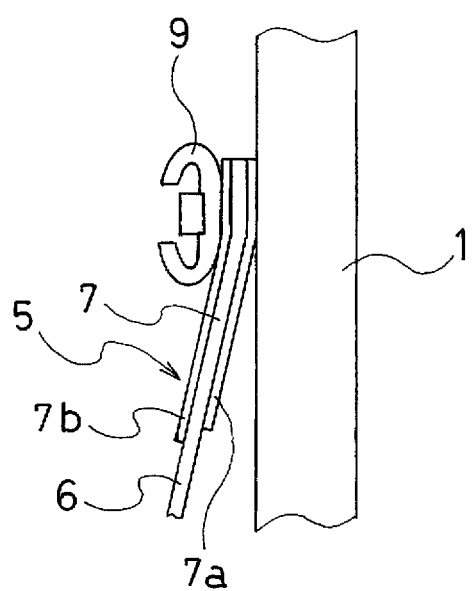
FIG. 5 is a magnified cross-sectional view of a tank-ward end of the gasholder sealing member depicted in FIG. 1.
Figure 6:
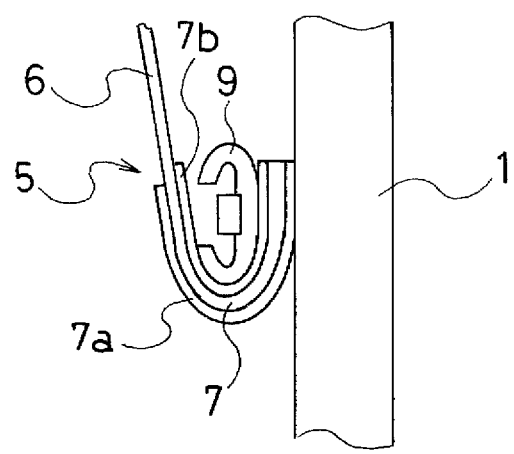
FIG. 6 is a magnified cross-sectional view of a tank-ward end of the gasholder sealing member depicted in FIG. 4.

A C-shaped clamp is used for the tank-side anchoring member 9, as illustrated, for example, in FIGS. 5 and 6. C-shaped clamps are intermittently disposed around the entire circumference of the inner circumferential surface of the tank 1. The use of C-shaped clamps causes the tank sealing member 5 to follow the curved surfaces of the clamps when the shock-absorbing member 3 rises, mitigating the load upon the bent section of the tank sealing member 5. The lack of corners on the surfaces contacting the tank sealing member 5 inhibits damage to the tank sealing member 5.

Figure 7:
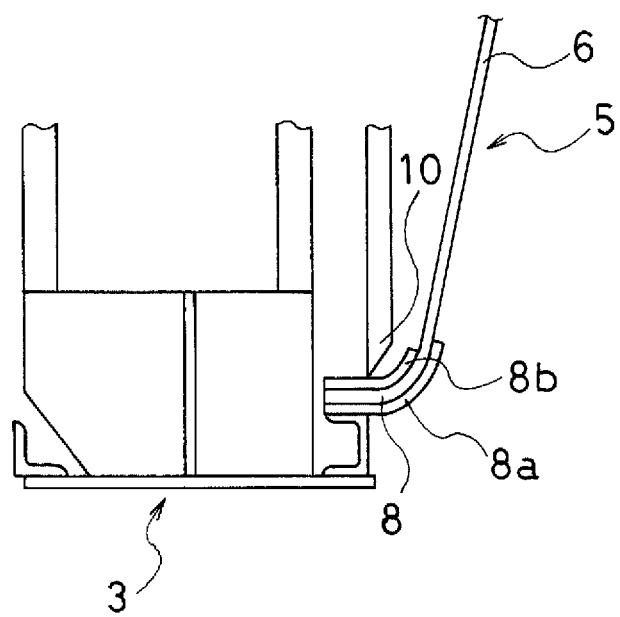
FIG. 7 is a magnified cross-sectional view of a shock-absorbing member-ward end of the gasholder sealing member depicted in FIG. 1.
Figure 8:
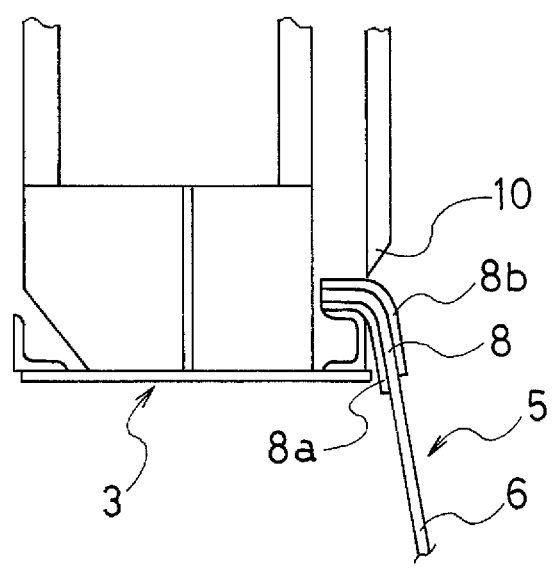
FIG. 8 is a magnified cross-sectional view of a shock-absorbing member-ward end of the gasholder sealing member depicted in FIG. 4.

As illustrated in FIGS. 7 and 8, the shock-absorbing member-ward end 8 of the tank sealing member 5 is anchored by the shock-absorbing member-side anchoring member 10. In the examples illustrated in the drawings, the shock-absorbing member-ward end 8 of the tank sealing member 5 is sandwiched, but the present technology is not limited to such a configuration. It is also possible not to provide cover parts 8a, 8b on the shock-absorbing member-ward end 8, and have the main body 6 of the tank sealing member 5 being anchored by the shock-absorbing member-side anchoring member 10. However, a ventilation port 12 is provided in the upper part of the tank 1 in order to discharge the air in a portion not including the gas storage space 11 within the tank 1 when the volume of the gas storage space 11 increases, with the result that the low temperature of the outside air is easily transmitted by the shock-absorbing member 3. Thus, it is preferable to provide cover parts 8a, 8b on the shock-absorbing member-ward end 8 as well and cover both surfaces of the shock-absorbing member-ward end 8 with EPDM, as illustrated in FIGS. 7 and 8. It is thus possible to keep the main body 6 of the tank sealing member 5 from not contacting the shock-absorbing member 3 and the shock-absorbing member-side anchoring member 10, regardless of the vertical position of the shock-absorbing member 3. The bending properties at low temperatures of the shock-absorbing member-ward end 8, which, like the tank-ward end 7, easily transmits the low temperature of the outside air, are thus improved, yielding a further improvement in the bending resistance at low temperatures of the tank sealing member 5 as a whole. This is even more advantageous in preventing crack formation at low temperatures.

The length covered by EPDM can be differentiated between one surface and the other surface of the end(s) covered by EPDM. Specifically, the length covered by EPDM can be differentiated between the cover part 7a on the surface facing the tank 1 and the cover part 7b on the surface facing the tank-side anchoring member 9 on the tank-ward end 7. Similarly, the length covered by EPDM can be differentiated between the cover part 8a on the surface facing the gas storage space 11 and the cover part 8b on the opposite surface of the shock-absorbing member-ward end 8. Thus, there exist portions where only one side is covered by EPDM at the boundaries between the portions where both surfaces are covered by EPDM and the portion not covered by EPDM, allowing abrupt changes in bending rigidity at the boundaries between EPDM-covered ends and the portions not covered by EPDM. This eliminates excess concentrations of stress, which is advantageous in improving bending resistance. In addition, it is possible to use EPDM only on the necessary portions (lengths), allowing the amount of EPDM used to be minimized and material costs to be kept down.

The length covered by the cover part 7a is set so that the main body 6 of the tank sealing member 5 does not contact the inner circumferential surface of the tank 1 when, for example, the shock-absorbing member 3 falls. The length covered by the cover part 7b is set so that the main body 6 of the tank sealing member 5 does not contact the tank-side anchoring member 9 when, for example, the shock-absorbing member 3 rises. The length covered by the cover part 8a is set so that the main body 6 of the tank sealing member 5 does not contact the outer edge of the shock-absorbing member 3 when, for example, the shock-absorbing member 3 rises. The length covered by the cover part 8b is set so that the main body 6 of the tank sealing member 5 does not contact the outer edge of the shock-absorbing member 3 when, for example, the shock-absorbing member 3 falls.

The thickness covered by EPDM can be differentiated between one surface and the other surface of the end(s) covered by EPDM. Specifically, the thickness covered by EPDM can be differentiated between the cover part 7a facing the tank 1 and the cover part 7b facing the tank-side anchoring member 9 on the tank-ward end 7. Similarly, the thickness covered by EPDM can be differentiated between the cover part 8a facing the gas storage space 11 and the cover part 8b on the opposite side of the shock-absorbing member-ward end 8. This allows the minimum necessary thickness covered by EPDM to be used on each of the surfaces, increases in the bending rigidity of the end(s) covered by EPDM to be suppressed, and bending resistance to be improved. In addition, the minimum necessary amount of EPDM is used, allowing material costs to be kept down.

The thickness covered by EPDM is set, for example, to 1.2 mm to 1.4 mm. This allows for effective suppression of transmission of the low temperature of the outside air to the main body 6 of the tank sealing member 5. Concurrently, bending resistance at low temperatures can be improved.

If the covering thickness is differentiated between both surfaces of the tank sealing member 5, it is preferable for the thickness covered by the cover part 7a contacting the inner circumferential surface of the tank 1, where the low temperature of the outside air is most easily transmitted, to be greater than the thickness covered by the cover part 7b on the tank-ward end 7 so as to prevent cooling of the tank sealing member 5. On the shock-absorbing member-ward end 8, the thickness covered by the cover part 8b contacting the side of the shock-absorbing member 3 that is exposed to the outside air is preferably greater than the thickness covered by the cover part 8a so as to prevent cooling of the tank sealing member 5.

Figure 9:
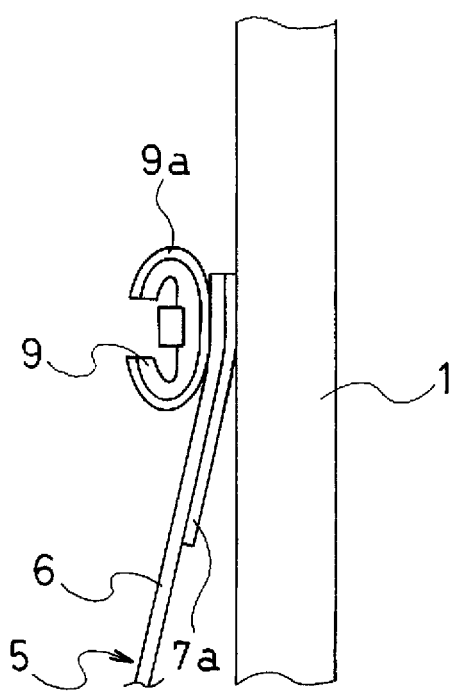
FIG. 9 is a magnified cross-sectional view of a tank-ward end (not filled with gas) of a gasholder sealing member according to another embodiment of the seal structure according to the present technology.
Figure 10:
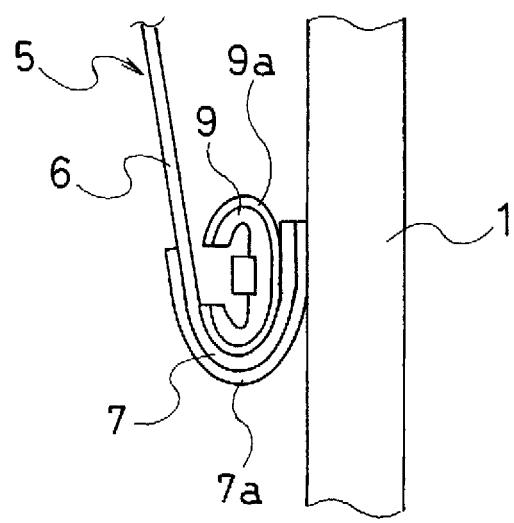
FIG. 10 is a magnified cross-sectional view of a tank-ward end (filled with gas) of a gasholder sealing member according to another embodiment of the seal structure according to the present technology.

In the embodiment of a sealing structure illustrated in FIGS. 9 and 10, a cover part 9a of EPDM is provided on a surface of the tank-side anchoring member 9 facing the tank-ward end 7 instead of the cover part 7b provided on the surface of the tank-ward end 7 of the tank sealing member 5 facing the tank-side anchoring member 9 in the embodiment of a sealing structure illustrated in FIGS. 5 and 6. Features not expressly discussed are identical to those of the embodiment described above. In this structure as well, the tank-ward end 7 of the tank sealing member 5 does not directly contact the inner circumferential surface of the tank 1 and the tank-side anchoring member 9, which are susceptible to low temperatures due to the effects of the outside air, regardless of the vertical position of the shock-absorbing member 3 due to EPDM interposed therebetween. The transmission of the low temperature of the outside air to the main body 6 of the tank sealing member 5 not covered by EPDM is thus inhibited, allowing the bending resistance at low temperatures of the tank sealing member 5 as a whole to be improved. In addition, only one side of the tank sealing member 5 itself is covered at the tank-ward end 7, allowing abrupt changes in bending rigidity at the boundary between the portion covered by EPDM and the portion not covered by EPDM to be avoided. Excessive concentrations of stress are thus prevented, allowing for improved bending resistance.

The invention claimed is:

1. A gasholder sealing member comprising a base fabric made of fibrous material covered by a rubber material, the gasholder sealing member having a cylindrical form and configured to rise and fall within a tank, the gasholder sealing member further comprising a tank anchoring portion and a shock-absorbing member anchoring portion, wherein
both surfaces of at least the tank anchoring portion anchored to an inner circumferential surface of the tank are covered by ethylene propylene diene rubber, and a portion other than the tank anchoring portion and the shock-absorbing member anchoring portion is not covered by ethylene propylene diene rubber; and
a covering thickness of the ethylene propylene diene rubber differs between one surface and an opposite surface of at least one end of the gasholder sealing member covered by the ethylene propylene diene rubber;
wherein the gasholder sealing member is flexible and configured to allow the shock-absorbing member anchoring portion to pass through an opening at the tank anchoring portion with the rising and falling of the tank.

2. The gasholder sealing member according to claim 1, wherein both surfaces of the shock-absorbing member anchoring portion are covered by the ethylene propylene diene rubber.

3. The gasholder sealing member according to claim 2, wherein a length covered by the ethylene propylene diene rubber differs between the one surface and the opposite surface of the at least one end covered by the ethylene propylene diene rubber.

4. The gasholder sealing member according to claim 2, wherein the covering thickness of the ethylene propylene diene rubber is from 1.2 mm to 1.4 mm.

5. The gasholder sealing member according to claim 3, wherein the covering thickness of the ethylene propylene diene rubber is from 1.2 mm to 1.4 mm.

6. The gasholder sealing member according to claim 1, wherein:
the ethylene propylene diene rubber comprises an inner cover part and an outer cover part,
a length of one of the inner cover part and the outer cover part of the tank anchoring portion is greater than a length of another one of the inner cover part and the outer cover part of the tank anchoring portion,
a length of one of the inner cover part and the outer cover part of the shock-absorbing member anchoring portion is greater than a length of another one of the inner cover part and the outer cover part of the shock-absorbing member anchoring portion, and
the lengths are measured along the gasholder sealing member between the tank anchoring portion and the shock-absorbing member anchoring portion.

7. The gasholder sealing member according to claim 6, wherein the covering thickness of the ethylene propylene diene rubber is from 1.2 mm to 1.4 mm.

8. The gasholder sealing member according to claim 1, wherein the covering thickness of the ethylene propylene diene rubber is from 1.2 mm to 1.4 mm.

9. The gasholder sealing member according to claim 1, wherein both surfaces of the shock-absorbing member anchoring portion anchored to an outer edge of a shock-absorbing member configured to rise and fall within the tank are covered by the ethylene propylene diene rubber.

10. The gasholder sealing member according to claim 1, wherein both surfaces of the shock-absorbing member anchoring portion anchored to an outer edge of a shock-absorbing member configured to rise and fall within the tank are not covered by the ethylene propylene diene rubber.

11. The gasholder sealing member according to claim 1, wherein the portion other than the tank anchoring portion and the shock-absorbing member anchoring portion that is not covered by ethylene propylene diene rubber is flexible.

12. A gasholder sealing structure comprising a cylindrically-formed gasholder sealing member that forms a seal between an inner circumferential surface of a tank constituting a gasholder and an outer edge of a shock-absorbing member that rises and falls within the tank along with a movable piston that rises and falls within the tank at an outer circumferential side of the movable piston, the gasholder sealing member comprising a base fabric made of fibrous material covered by a rubber material, the structure comprising:
a tank-side anchoring member that projects from the inner circumferential surface of the tank and anchors a tank anchoring portion of the gas holder sealing member; and a shock-absorbing member-side anchoring member that is provided on the outer edge of the shock-absorbing member and anchors a shock-absorbing member-ward end of the gasholder sealing member, both surfaces of at least the tank anchoring portion, out of the tank anchoring portion and the shock-absorbing member anchoring portion, being covered by ethylene propylene diene rubber, a portion other than the tank anchoring portion and the shock-absorbing member anchoring portion not being covered by ethylene propylene diene rubber, and a surface of the portion of the gasholder sealing member not covered by ethylene propylene diene rubber not contacting the inner circumferential surface of the tank or the tank-side anchoring member regardless of a vertical position of the shock-absorbing member;
wherein the gasholder sealing member is flexible and configured to allow the shock-absorbing member anchoring portion to pass through an opening at the tank anchoring portion with the rising and falling of the tank.

13. The gasholder sealing structure according to claim 12, wherein both surfaces of the shock-absorbing member anchoring portion are covered by ethylene propylene diene rubber, and a surface of the portion of the gasholder sealing member not covered by ethylene propylene diene rubber does not contact the shock-absorbing member regardless of the vertical position of the shock-absorbing member.

14. A gasholder sealing structure comprising a cylindrically-formed gasholder sealing member that forms a seal between an inner circumferential surface of a tank constituting a gasholder and an outer edge of a shock-absorbing member that rises and falls within the tank along with a movable piston that rises and falls within the tank at an outer circumferential side of the movable piston, the gasholder sealing member comprising a base fabric made of fibrous material covered by a rubber material, the structure comprising:
- a tank-side anchoring member that projects from the inner circumferential surface of the tank and sandwiches and anchors a tank anchoring portion of the gasholder sealing member between itself and the inner circumferential surface of the tank; and a shock-absorbing member-side anchoring member that is provided on the outer edge of the shock-absorbing member and anchors a shock-absorbing member anchoring portion of the gasholder sealing member, a surface of the tank anchoring portion facing the inner circumferential surface of the tank being covered by ethylene propylene diene rubber, and a surface of the tank-side anchoring member facing the tank anchoring portion being covered by ethylene propylene diene rubber;
- wherein the gasholder sealing member is flexible and configured to allow the shock-absorbing member anchoring portion to pass through an opening at the tank anchoring portion with the rising and falling of the tank.

* * * * *